April 14, 1953     D. E. CARPENTER     2,634,935
ADJUSTABLE HEADLAMP MOUNTING FOR FARM TRACTORS
Filed Jan. 20, 1950

INVENTOR.
*Donald E. Carpenter*
BY
*W. S. McDowell*
ATTORNEY

Patented Apr. 14, 1953

2,634,935

UNITED STATES PATENT OFFICE 2,634,935

ADJUSTABLE HEADLAMP MOUNTING FOR FARM TRACTORS

Donald E. Carpenter, Worthington, Ohio

Application January 20, 1950, Serial No. 139,550

1 Claim. (Cl. 248—181)

This invention relates to base brackets for lamp casings, having particular reference to supporting brackets of the type in which lamp casings associated therewith are subject to positional adjustment for the purpose of controlling more advantageously the directions of light propagation issuing from such casings.

It is customary in the mounting of headlamps on farm tractors to join stationarily the casings of such lamps with associated supports. This results in certain fixity in position on the part of the headlamps and their nonadaptability for the dissemination of light in other than but limited areas. In farm tractor operations, particularly, it is often desirable to direct light rays issuing from headlamps so that areas lateral to the direction of advance of a tractor may be illuminated, as well as overhead regions, as when a tractor is engaged in loading operations. The conventional fixed lamps do not admit of such flexibility in light control and, accordingly, it is an object of the present invention to provide an improved mounting bracket for such a headlamp by which the latter may, by the hands of an operator, be adjusted to assume various positions of light propagation, and positive retention in such adjusted positions.

Another object is to provide an adjustment-admitting supporting means for vehicle headlamps of simple, practical and sturdy design, and so constructed as to provide for the tilting of an associated lamp casing thereon in a manner changing the operating positions of the principal longitudinal axis of the lamp casing with respect to the horizontal, as well as admitting of rotation of the lamp about a vertical axis to admit of the illumination of lateral areas of wide expanse.

For a further understanding of the invention, reference is to be had to the following description and the accompanying drawing, wherein.

Figure 1:
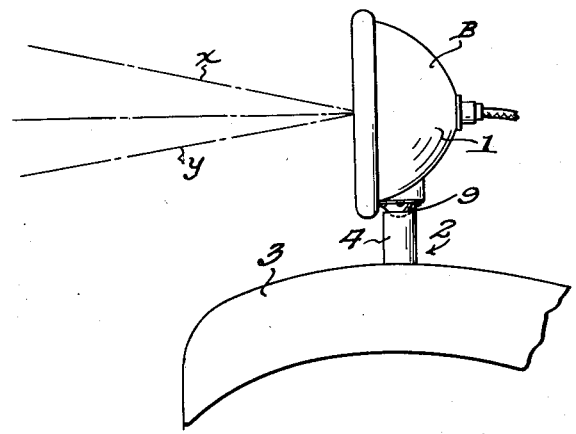
Fig. 1 is a side elevational view of a tractor headlamp mounting bracket formed in accordance with the present invention.
Figure 3:
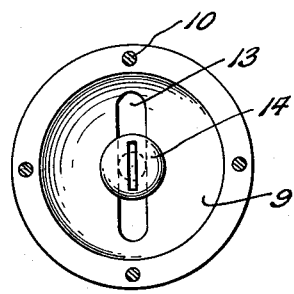
Fig. 3 is a horizontal sectional view on the plane indicated by the line 3—3 of Fig. 2.
Figure 2:
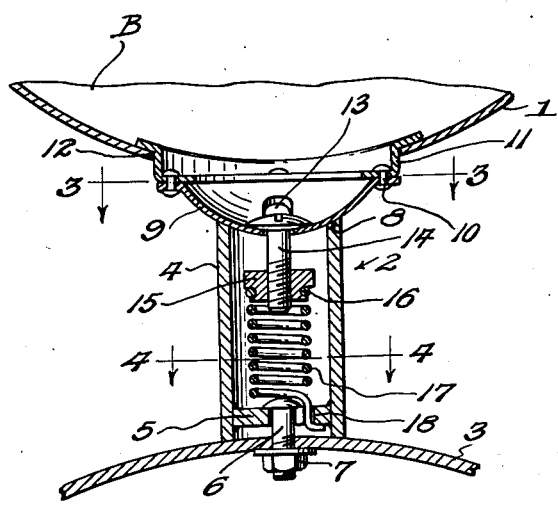
Fig. 2 is a vertical sectional view taken through the bracket and associated parts.
Figure 4:
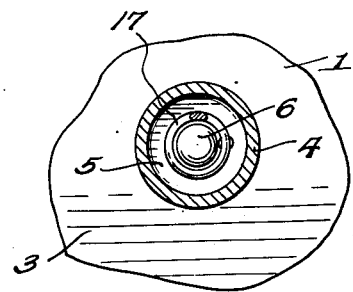
Fig. 4 is a similar view on the line 4—4 of Fig. 2.

Referring to the drawings, the numeral 1 designates a tractor headlamp, the numeral 2 the supporting bracket means comprising the present invention and the numeral 3 the fender, frame or other stationary part of a tractor on which the lamp is mounted.

The bracket means in this instance comprises a cylindrical base member 4, which is provided internally, adjacent to its lower end, with a spider 5. This spider is formed with an axial opening for the reception of the upper portion of the shank of a headed bolt 6, the lower portion of said shank passing through an opening provided in the tractor fender or frame 3. The threaded end of the bolt shank receives a washer and a nut 7 which, when tightened, hold the base member 4 in a secure upright position in connection with the fender or frame 3.

The upper end of the base member is provided with inwardly chamfered edges forming a seat 8 upon which is positioned a depending convex or semi-spheroidal plate element 9, the bounding edges of the latter being riveted or otherwise attached as at 10 to a base ring 11 which is stationarily carried by the lower part of the body B of the headlamp 1, the ring projecting through an opening 12 formed in said body. The convex plate 9 is provided with a slot 13 which receives the shank of a headed bolt 14, the lower threaded end of said bolt carrying a nut 15. To this nut, there is secured as at 16 the upper end of a coil contractile spring 17, the lower end of said spring being extended through an opening 18 formed in the spider 5, whereby the contraction of the spring 17 serves to maintain positively the convex plate 9 in its seated position on the upper end 8 of the tubular base member 4.

The contraction of the spring 17 is such as to hold the headlamp B in various positions of adjustment which the same may be caused to assume. In such adjustment, the lamp may be turned horizontally about the vertical axis of the member 4 to direct light rays issuing therefrom to the right or left of a normal straight-ahead position. Again, the headlight may be tilted so that its major longitudinal axis of light propagation may be raised or lowered, as indicated at x and y in Fig. 1 of the drawings. All these adjustments of the headlamp may be effected by the hands of an operator and without the aid of wrenches or other tools. Thus the adjustments may be made quickly and when once made will be positively maintained by the action of the spring 17. The construction is comparatively simple and is readily adaptable to conventional types of tractor headlamps.

I claim:

Vehicle headlamp supporting means comprising: a convex plate adapted for rigid attachment to the under side of the outer casing of a headlamp, said plate being formed centrally with an elongated slot, a vertically disposed hollow base member formed at its upper end with an inwardly chamfered, annular edge for the seated reception of said plate, means for securing said base member at its lower end to a stationary part of an associated vehicle, a headed element having a shank projecting through the slot of said plate and into said base member, the head of said element being disposed within the confines of said plate above said slot, and a coiled contractile spring connected between said element and said base member for maintaining said plate in frictional seating engagement with the chamfered edge of said base member, said headed element providing for rotation of said plate relative to said base member, and the slot in said plate providing for relative tilting movement of said plate relative to said headed element and said base member.

DONALD E. CARPENTER.

References Cited in the file of this patent

UNITED STATES PATENTS

| Number | Name | Date |
|---|---|---|
| 662,219 | Carter | Nov. 20, 1900 |
| 791,682 | Fall | June 6, 1905 |
| 896,445 | Fredericks | Aug. 18, 1908 |
| 1,358,640 | Koyama | Nov. 9, 1920 |
| 1,599,986 | Chapel | Sept. 14, 1926 |
| 1,749,868 | Anderson | Mar. 11, 1930 |
| 2,066,981 | Koca | Jan. 5, 1937 |